United States Patent [19]

Berg et al.

[11] Patent Number: 4,529,645

[45] Date of Patent: Jul. 16, 1985

[54] POLYETHYLENE-TEREPHTHALATE-BACKED ADHESIVE TAPE OR EXTREME DIMENSIONAL STABILITY

[75] Inventors: James G. Berg, North Saint Paul; Ta-Sheng Wei, Woodbury, both of Minn.

[73] Assignee: Minnesota Mining and Manufacturing Company, St. Paul, Minn.

[21] Appl. No.: 435,252

[22] Filed: Oct. 19, 1982

[51] Int. Cl.[3] .......... G02B 5/16

[52] U.S. Cl. .......... 428/294; 428/343; 428/337; 428/910; 428/483

[58] Field of Search .......... 428/343, 483, 294, 337, 428/352, 355, 910

[56] References Cited

U.S. PATENT DOCUMENTS

| | | | |
|---|---|---|---|
| 2,928,132 | 3/1960 | Richards | 18/48 |
| 3,088,848 | 5/1963 | Tritsch | 428/343 |
| 3,372,049 | 3/1968 | Schaffhausin | 428/343 |
| 3,432,591 | 3/1969 | Heffelfinger | 428/692 X |
| 3,881,976 | 5/1975 | Jones | 156/180 |
| 4,059,667 | 11/1977 | Pangonis | 264/289 |
| 4,138,193 | 2/1979 | Olsnewski | 309/96 |
| 4,196,254 | 4/1980 | Puskadi | 428/341 |
| 4,275,107 | 6/1981 | Bartkus | 428/220 |

OTHER PUBLICATIONS

D. Gloge, "Optical-Fiber Packaging and Its Influence on Fiber Straightness and Loss," B.S.T.J., 54, No. 2 (Feb., 1975), pp. 245, 246, 255, 256, 259, 260, 262.

M. J. Buckler, M. R. Santana & M. J. Saunders, "Lightguide Cable Manufacture and Performance," B.S.T.J., 57, No. 6 (Jul.-Aug., 1978), pp. 1745-1757.

J. L. Koenig and M. J. Hannon, "Infrared Studies of Chain Folding in Polymers. III. Polyethylene Terephthalate," J. Macromol. Sci. (Phys.), 119-145 (B1(1), (1967).

*Primary Examiner*—George F. Lesmes
*Assistant Examiner*—Nancy A. B. Swisher
*Attorney, Agent, or Firm*—Donald M. Sell; James A. Smith; Gerald F. Chernivec

[57] ABSTRACT

Adhesive tape useful in supporting an array of parallel optical fibers in an optical transmission cable comprising an adhesive-covered biaxially oriented polyethylene terephthalate film having defined ranges for the proportion of gauche and trans conformations of the ethylene glycol linkages of the polyethylene terephthalate molecule, as measured by infrared spectroscopy, whereby extreme dimensional stability is achieved.

6 Claims, 1 Drawing Figure

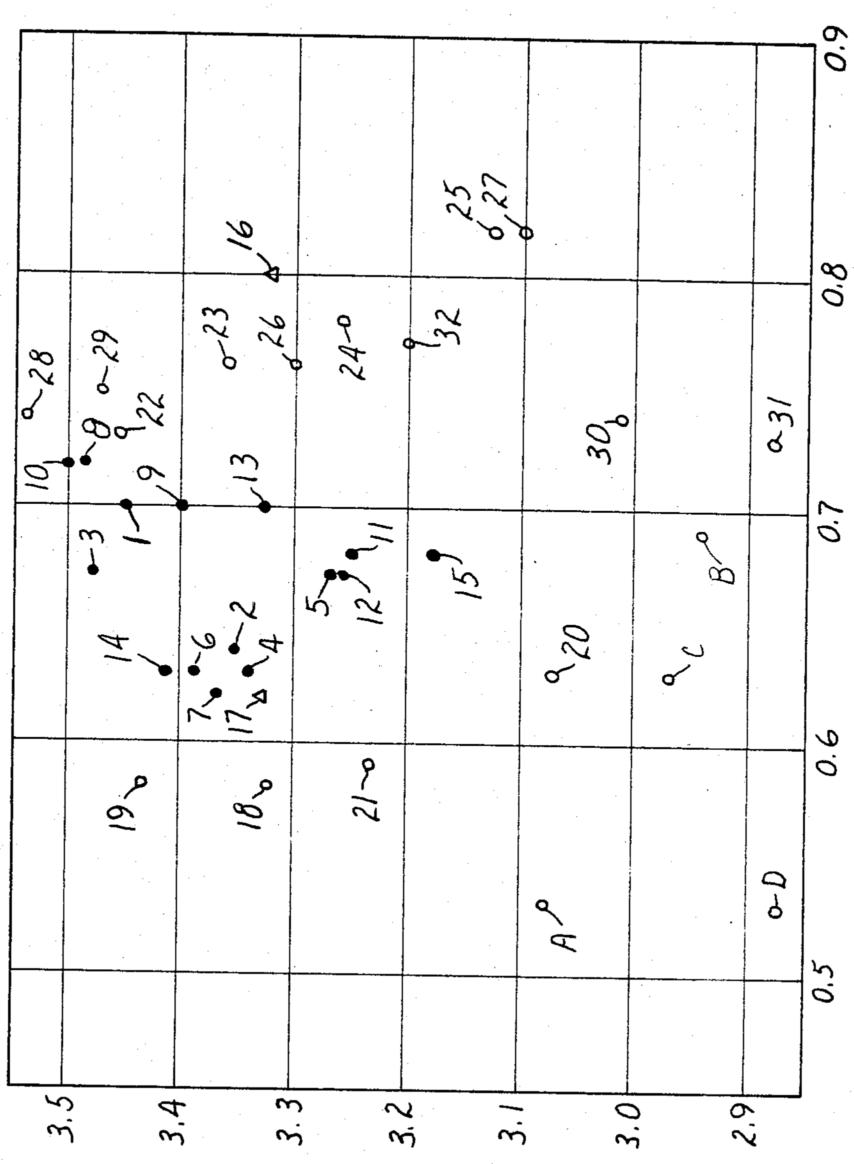

POLYETHYLENE-TEREPHTHALATE-BACKED ADHESIVE TAPE OR EXTREME DIMENSIONAL STABILITY

BACKGROUND OF THE INVENTION

In one proposal for incorporating optical fibers into cables, individual fibers are coated with polymer, assembled in parallel coplanar groups, and formed into multifiber ribbons; and the ribbons are then assembled one over the other to form a fiber array. The multifiber ribbons are desirably made by laminating the groups of parallel coplanar fibers between two pressure-sensitive adhesive tapes, disposed face-to-face, with the fibers encapsulated in the adhesive between the tape backings.

Polyethylene-terephthalate-backed pressure-sensitive adhesive tapes are a likely choice for forming the multifiber ribbons because they offer a desired combination of mechanical and thermal properties and are low in cost (certain films that would otherwise be useful, such as films of polyimide, polytetrafluoroethylene, and polyparabanic acid, are too costly for widespread use in an optical transmission cable). However, existing polyethlyene terephthalate films have a serious deficiency, in that they lack the extreme resistance to lengthwise or transverse heat-shrinkage required in optical fiber cables. Shrinkage of the tapes, either while the multifiber ribbons are being processed into cable at elevated temperatures or during subsequent use of a completed cable, would cause the optical fibers to slightly buckle or bend. When the bending occurs as microscopic-sized bends (i.e., if the bending has components of spatial frequency between 0.1 and 10 per millimeter length of fiber), a partial loss in the optical signals being transmitted through the cable may occur. This well-known effect, called microbending loss, increases as the amount of tape shrinkage increases, since more tape shrinkage increases the amplitude of the microbending.

Heat-shrinkage of polyethylene terephthalte film has been greatly reduced in the past by a variety of heat-setting operations performed during manufacture of the film. However, even these stabilized films generally exhibit shrinkages of 0.4 to 0.6 percent or more in length upon exposure to 100° C. for two hours, and of 3 percent or more after one hour at 175° C.; and some previous films, including one that is highly stabilized against lengthwise shrinkage, exhibit high amounts of shrinkage in the transverse or cross direction. Furthermore, adhesive tapes made from the prior films tend to have even higher shrinkages, e.g., because of stresses introduced into the film during the adhesive-coating operation.

Shrinkages of 0.4 to 0.6 percent or more will produce undesirable microbending losses, and a temperature of 100° C. that produces such shrinkage can be readily reached during manufacture of optical-fiber cable, thereby inherently flawing the cable. Shrinkages at 175° C. are regarded as indicative of the long-term shrinkage that may occur during use of a completed cable, because shrinkages at that temperature are associated with fundamental molecular rearrangements, such as increased crystallinity, which may occur within a film over its useful life. A shrinkage of more than 3 percent after one hour at 175° C. suggests a long-term instability that is undesirable in optical-fiber cables.

A rather thick film (0.0047 inch; 0.120 millimeter) commercially available from E. I. du Pont de Nemours and Company (Dimensionally Stabilized 500D film) has been reported to shrink 0.5 percent in length after againg for an unspecified time at 150° C. However, films of such thickness would not be suited for optical-fiber cables due to the increased stiffness they would give a cable, the increased space they would occupy, and their higher cost. Furthermore, so far as known, a stable adhesive tape using such a film as a backing has not been supplied.

In summary, preparation of multifiber ribbons for optical transmission cables requires new thin polyethylene-terephthalate-backed adhesive tapes capable of apparently small, but significant and difficult-to-achieve improvements in dimensional stability.

SUMMARY OF THE INVENTION

It has now been found that an adhesive tape having the stability needed for use in an optical-fiber cable can be achieved by use for the tape backing of selected polyethlyene terephthalate films which can be characterized by certain infrared spectroscopic parameters. These parameters represent the amount of gauche and trans conformations of the ethylene glycol linkages in the polyethlyene terephthalate molecules. Gauche conformations of the ethylene glycol linkage occur mostly in the amorphous regions of the film, while trans conformations occur mostly in the crystalline regions; and indications of the amount of gauche and trans conformations represent, respectively, the amount of amorphous and crystalline regions in the film.

The proportion of amorphous and crystalline regions influences the dimensional stability of the film. Upon heating of a polyethylene terephthalate film above its glass transformation temperature, molecules in the amorphous region tend to rearrange themselves to a more crystalline state, and this rearrangement is accompanied by change in the dimensions of the film, particularly shrinkage of the film. It has been commonly believed that increases in crystallinity of a polyethylene terephthalate film by heating it during processing make the film more dimensionally stable by reducing the capacity of the film to undergo further transitions from amorphous to crystalline. However, this common belief has now been found to be incomplete and inaccurate, because it leaves out of consideration the amount of amorphous region in the film. It has been found that a polyethylene terephthalate film will lack the extreme dimensional stability needed in optical-fiber cables if the amorphous region is too small. To achieve desired dimensional stability, there should be a balance between the proportion of amorphous and crystalline regions, and this needed balance can be indicated by infrared spectroscopic measurements of the amount of gauche and trans conformations.

In brief summary, an adhesive tape of the invention comprises an adhesive-covered biaxially oriented polyethylene terephthalate film, which film is less than about 50 micrometers thick and exhibits gauche and trans parameters as described herein of, respectively, between about 0.6 and 0.725 for the gauche parameter and greater than 3.1 for the trans parameter. Tapes as described have been found to shrink on average less than about 0.2% in length upon exposure in an unstressed condition for 2 hours to 100° C., and less than about 2% in length upon exposure in an unstressed condition for 1 hour at 175° C.

DESCRIPTION OF THE DRAWING

FIG. 1 is a plot of the trans and gauche parameters as described herein, both for representative polyethylene terephthalate films useful in adhesive tapes of the invention, and for representative polyethylene terephthalate films from tapes outside the invention.

DETAILED DESCRIPTION

Polyethylene terephthalate film used in tape of the invention is generally between about 10 and 50 micrometers in thickness. When thicker than about 50 micrometers, polyethylene terephthalate film tends to be too stiff and bulky for use in an optical-fiber cable, while such films less than about 10 micrometers in thickness shrink too much at elevated temperature. Polyethylene terephthalate film of about 25 micrometers thickness appears to provide an optimum combination of properties.

The film can be processed in various ways to satisfy the needed gauche and trans parameters, and to have the consequent dimensional stability, but we prefer to use film that is conventionally made except that it is heat set at a higher-than-normal temperature, e.g., 245° C., and then further processed by coating it with adhesive while it is under low mechanical stress or tension, and subsequently heating the resulting tape, e.g., by heating to 175° C. for a few minutes, while the tape is maintained at low tension on a process line.

Indications of gauche and trans conformations of the ethylene glycol linkages can be determined by known infrared spectroscopic techniques using a Fourier transform infrared spectrophotometer and measuring the amplitude of the absorption bands at 896 centimeters$^{-1}$ (for gauche conformations) and 973 centimeters$^{-1}$ (trans conformations). See J. L. Koenig and M. J. Hannon, "Infrared Studies of Chain Folding in Polymers. II Polyethylene Terephthalate," J. Macromolecular Science (Physics), Vol. B1 (1), page 119–145 (1967) for a discussion of the technique. The higher the amplitude of the particular absorption bands, the higher the amount of gauche or trans conformations, and correspondingly the higher the amount of amorphous or crystalline regions within the film. However, the amplitudes of the gauche and trans absorption bands will also vary with variations in the thickness of the film tested, and to compensate for this variation, the amplitude measured for the gauche and trans absorption bands is divided by the amplitude of the absorption band at 795 centimeters$^{-1}$, which is known to be an indication of film thickness. The values of gauche and trans parameters stated herein are accordingly ratios, which were determined using films of about 25 micrometers thickness. Polyethylene terephthalate films of greater thickness tend to shrink less at elevated temperature than films of lower thickness, and for that reason the ranges of useful trans and gauche readings may be somewhat broader for thicker films than for thinner films.

In the case of adhesive tapes, trans and gauche parameters were measured on the film after removing the adhesive with heptane solvent. Experiments with uncoated films and with films from which adhesive has been removed with heptane indicate that such a removal does not change the spectroscopic measurements.

Pressure-sensitive adhesives, especially acrylate-based copolymers as described in Ulrich, U.S. Pat. No. Re. 24,906, are especially desired in tape of the invention. However, other adhesives can be used, including rubber-resin and silicone pressure-sensitive adhesives. The adhesives can be coated from solution onto the polyethylene terephthalate backing and the film dried, or a preformed film of adhesive can be laminated to the film backing. Whatever process is used, the equipment used should apply little tension to the film, e.g., by maintaining slackness between driving or idler rolls.

Optical fibers for use in tape of the invention are well known. In one useful form a glass core such as germania-doped borosilicate is formed by a modified chemical vapor deposition process. The glass core is typically clad with silica glass which, in turn, is sheathed in a polymer such as ethylene vinyl acetate (see M. J. Buckler, M. R. Santana, and M. J. Saunders, "Lightguide Cable Manufacture and Performance," B.S.T.J., 57, No. 6 (July–August, 1978), pp 1745–1757). Multifiber ribbons are made from tapes of this invention and optical fibers by known procedures, such as described in M. J. Saunders and W. L. Parham, "Adhesive Sandwich Optical Fiber Ribbons," B.S.T.J., 56, No. 6, pp 1013–1014 (1977). Alternative polymer coatings on the optical fibers may be used, in which case alternative adhesive systems may be desired for optimum physical and chemical compatibility. Acrylate adhesives achieve good compatibility with acrylate-based or ethylene vinyl acetate-based coatings.

The invention will be further illustrated by the following example. Polyethylene terephthalate film 25 micrometers in thickness and conventionally made with a machine-direction stretch ratio of 3.5 and a transverse-direction stretch ratio of 3.8 was heat set using an oven temperature of 240° C. Using standard techniques, apparatus, and material, the film was squeeze-roll-coated on one side and irradiated with ultraviolet light to form a primer as described in Charbonneau et al, U.S. Pat. No. 3,188,266, and was squeeze-roll-coated on the other side with a low-adhesion backsize as described in Dahlquist, U.S. Pat. No. 2,532,011. The squeeze-roll apparatus comprised vertically aligned rollers, with the bottom one partially immersed in a pan of the material being coated. Solvent from the coated material flashes rapidly from the very thin coating applied by the squeeze-roll coater. A pressure-sensitive adhesive terpolymer of isooctylacrylate, acrylic acid, and glycidyl methacrylate was coated from solution onto the primed surface of the film and transported through an oven at temperatures not exceeding 250° F. (120° C.) and at a tension not exceeding about two pounds (0.9 kilograms) per inch (2.5 centimeter) width of film to remove solvent and to partially crosslink the adhesive.

A sample of the resulting adhesive tape 6 inches by 6 inches (15 centimeters by 15 centimeters) was thermally conditioned by suspending the tape, for two and one half minutes in an over heated to 175° C. Heat-shrinkage measurements were made on the tape in the manner discussed below, and found to be 0.05 percent at 100° C. and 0.14 percent at 175° C. Trans and gauche parameters measured on the film after removal of adhesive as discussed above were 3.45 and 0.70, respectively.

The heat-shrinkage tests were performed by cutting trapezoidal sections of tape or film having a 0.5 inch (1.27 centimeter) height, a two-inch-long (5-centimeter) bottom edge, and a 1.5-inch-long (3.8-centimeter) top edge (the top and bottom edges of the trapezoid were parallel to the machine direction of the film). To measure their dimensions in an unstressed condition, the samples were laid between two glass plates, and the two-inch (5-centimeter) length of the samples measured to the nearest 0.0001 inch (2.5 micrometers) using an optical comparator. For the adhesive-coated samples, the adhesive side of the tape, which faced upwardly from the bottom glass plate, was covered with chalk dust prior to placing the top glass plate over the tape. Next, the top glass plate was removed and, while the samples were still resting on the bottom plate, they were placed in an oven that was heated to 100° C.±1° C. and left there for a period of two hours; or they were placed in an oven that was heated to 175° C.±1° C. and left there for a period of one hour. After being removed from the oven and allowed to cool to room temperature, the samples were again placed between the glass plates, and the two-inch length measured to the nearest 0.0001 inch (2.5 micrometers).

Trans, gauche and heat-shrinkage measurements were also made on other tapes of the invention as well as tapes outside the invention, including commercially available tapes. The results are reported in the attached drawing, in which the trans parameter is plotted on the ordinate and the gauche parameter on the abscissa, and in the following table. The solid points in the drawing, 1 through 15, represent tapes that exhibit low heat-shrinkage of 0.2 percent or less after two hours at 100° C. and 2 percent or less after one hour at 175° C. (Point 1 is for the previously described example). The tapes represented by circles 18-32 exhibit heat-shrinkages higher than those of this invention, which would lead to undesirable microbending losses. The triangles 16 and 17 represent apparently anomalous results. Circles A, B, C, and D represent commercially available tapes, which as will be seen, exhibit heat-shrinkages higher than those of this invention. All the films measured were about 25 micrometers thick. As may be seen, the films from tapes of low heat-shrinkage tend to lie within the range of gauche parameters of about 0.6 to 0.725, with preferred results for these 25-micrometer films being obtained with a gauche parameter of about 0.625 or greater, and a trans parameter of greater than about 3.1.

TABLE

| Example No. | Infrared Spectroscopic Parameters: Gauche (A 896 $cm^{-1}$/ A 795 $cm^{-1}$) | Infrared Spectroscopic Parameters: Trans (A 973 $cm^{-1}$/ A 795 $cm^{-1}$) | Heat Shrinkage: After 2 hrs at 100° C. (percent) | Heat Shrinkage: After 1 hr at 175° C. (percent) |
|---|---|---|---|---|
| 1 | 0.70 | 3.45 | 0.05 | 0.14 |
| 2 | 0.64 | 3.35 | 0.14 | 1.67 |
| 3 | 0.67 | 3.48 | 0.11 | 1.26 |
| 4 | 0.63 | 3.34 | 0.08 | 1.28 |
| 5 | 0.67 | 3.27 | 0.12 | 1.56 |
| 6 | 0.63 | 3.39 | 0.19 | 1.57 |
| 7 | 0.62 | 3.37 | 0.20 | 1.96 |
| 8 | 0.72 | 3.49 | 0.14 | 1.62 |
| 9 | 0.70 | 3.40 | 0.11 | 1.62 |
| 10 | 0.72 | 3.50 | 0.03 | 0.97 |
| 11 | 0.68 | 3.25 | 0.08 | 1.76 |
| 12 | 0.67 | 3.26 | 0.13 | 1.28 |
| 13 | 0.70 | 3.33 | 0.04 | 1.40 |
| 14 | 0.63 | 3.41 | 0.12 | 1.74 |
| 15 | 0.68 | 3.18 | 0.08 | 1.10 |
| 16 | 0.80 | 3.32 | 0.03 | 1.55 |
| 17 | 0.62 | 3.33 | 0.20 | 3.44 |
| 18 | 0.58 | 3.32 | 0.06 | 2.39 |
| 19 | 0.58 | 3.43 | 0.06 | 2.44 |
| 20 | 0.63 | 3.07 | 0.23 | 2.30 |
| 21 | 0.59 | 3.23 | 0.21 | 3.23 |
| 22 | 0.73 | 3.46 | 0.26 | 1.59 |
| 23 | 0.76 | 3.36 | 0.20 | 1.28 |
| 24 | 0.78 | 3.26 | 0.40 | 3.08 |
| 25 | 0.82 | 3.13 | 0.56 | 2.26 |
| 26 | 0.76 | 3.30 | 1.26 | 4.41 |
| 27 | 0.82 | 3.10 | 0.81 | 3.65 |
| 28 | 0.74 | 3.54 | 0.85 | 3.62 |
| 29 | 0.75 | 3.47 | 0.84 | 2.68 |
| 30 | 0.74 | 3.01 | 0.42 | 2.70 |
| 31 | 0.73 | 2.88 | 0.74 | 3.33 |
| 32 | 0.77 | 3.20 | 0.99 | 4.69 |
| A | 0.53 | 3.08 | 0.44 | 2.55 |
| B | 0.69 | 2.94 | 0.61 | 3.03 |
| C | 0.63 | 2.97 | 0.52 | 2.09 |
| D | 0.53 | 2.87 | 0.64 | 2.56 |

What is claimed is:

1. Multifiber ribbon useful in optical transmission cables comprising a plurality of parallel polymer-coated optical fibers laminated between two adhesive-covered biaxially oriented polyethylene terephthalate films, which are less than about 50 micrometers in thickness and exhibit gauche and trans parameters as described herein of between about 0.6 and 0.725 for the gauche parameter and about 3.1 or greater for the trans parameter; the adhesive-covered films shrinking on average less than about 0.2 percent in length upon exposure in an unstressed condition for two hours at 100° C. and less than about 2 percent in length upon exposure in an unstressed condition for one hour at 175° C.

2. Multifiber ribbon of claim 1 in which the film exhibits a gauche parameter of about 0.625 or greater.

3. Multifiber ribbon of claim 1 in which the film is about 25 micrometers thick.

4. Multifiber ribbon of claim 1 in which the film is about 25 micrometers thick and exhibits a gauche parameter of about 0.625 or greater.

5. Multifiber ribbon of claim 1 in which the adhesive covering the film comprises a pressure-sensitive adhesive.

6. Multifiber ribbon of claim 5 in which the adhesive comprises an acrylate-based copolymer.

* * * * *